United States Patent
Yamazaki et al.

(10) Patent No.: US 8,977,547 B2
(45) Date of Patent: Mar. 10, 2015

(54) VOICE RECOGNITION SYSTEM FOR REGISTRATION OF STABLE UTTERANCES

(75) Inventors: Michihiro Yamazaki, Tokyo (JP); Jun Ishii, Tokyo (JP); Hiroki Sakashita, Tokyo (JP); Kazuyuki Nogi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 906 days.

(21) Appl. No.: 13/142,711

(22) PCT Filed: Oct. 8, 2009

(86) PCT No.: PCT/JP2009/005244
§ 371 (c)(1),
(2), (4) Date: Jun. 29, 2011

(87) PCT Pub. No.: WO2010/086925
PCT Pub. Date: Aug. 5, 2010

(65) Prior Publication Data
US 2011/0276331 A1    Nov. 10, 2011

(30) Foreign Application Priority Data
Jan. 30, 2009    (JP) .................................. 2009-019692

(51) Int. Cl.
*G10L 15/10*    (2006.01)
*G10L 17/00*    (2013.01)
(Continued)

(52) U.S. Cl.
CPC ................. *G10L 15/06* (2013.01); *G10L 17/04* (2013.01); *G10L 2015/0631* (2013.01)
USPC ........... 704/239; 704/231; 704/236; 704/238; 704/246; 704/247; 704/249; 704/250; 704/252; 704/254; 704/255; 704/275; 379/88.01; 379/88.02

(58) Field of Classification Search
CPC ....... G10L 17/00; G10L 17/005; G10L 17/02; G10L 17/04; G10L 17/0626; G10L 15/00; G10L 15/02; G10L 15/06; G10L 15/14; G10L 2015/00; G10L 2015/06; G10L 2015/063; G10L 2015/0631
USPC ......... 704/231, 236, 238, 239, 246, 247, 249, 704/250, 252, 254, 255, 275; 379/88.01, 379/88.02
See application file for complete search history.

(56) References Cited

U.S. PATENT DOCUMENTS 4,297,528 A    10/1981    Beno
4,716,593 A *  12/1987    Hirai et al. .................... 704/247
(Continued)

FOREIGN PATENT DOCUMENTS

DE    698 22 179 T2    7/2004
DE    10 2008 024 257 A1    11/2009
(Continued)

*Primary Examiner* — Paras D Shah
(74) *Attorney, Agent, or Firm* — Birch, Stewart, Kolasch & Birch, LLP

(57) ABSTRACT

A voice recognition system includes: a voice input unit 11 for inputting a voice uttered a plurality of times; a registering voice data storage unit 12 for storing voice data uttered the plurality of times and input into the voice input unit 11; an utterance stability verification unit 13 for determining a similarity between the voice data uttered the plurality of times that are read from the registering voice data storage unit 12, and determining that registration of the voice data is acceptable when the similarity is greater than a threshold Tl; and a standard pattern creation unit 14 for creating a standard pattern by using the voice data where the utterance stability verification unit 13 determines that registration is acceptable.

4 Claims, 6 Drawing Sheets

(51) Int. Cl.
  *G10L 15/28* (2013.01)
  *G10L 21/00* (2013.01)
  *H04M 1/64* (2006.01)
  *G10L 15/06* (2013.01)
  *G10L 17/04* (2013.01)

(56) References Cited

U.S. PATENT DOCUMENTS

| | | | |
|---|---|---|---|
| 4,751,737 A | 6/1988 | Gerson et al. | |
| 6,012,027 A * | 1/2000 | Bossemeyer, Jr. | 704/243 |
| 6,366,649 B1 * | 4/2002 | Chun et al. | 379/88.01 |
| 6,496,800 B1 * | 12/2002 | Kong et al. | 704/239 |
| 6,879,968 B1 * | 4/2005 | Hayakawa et al. | 706/20 |
| 7,447,632 B2 * | 11/2008 | Itou | 704/247 |
| 7,502,736 B2 * | 3/2009 | Hong et al. | 704/232 |
| 7,657,431 B2 * | 2/2010 | Hayakawa | 704/246 |
| 7,835,913 B2 * | 11/2010 | Aubauer | 704/275 |
| 8,190,437 B2 * | 5/2012 | Farrell et al. | 704/273 |
| 8,347,247 B2 * | 1/2013 | Harrington | 716/113 |
| 2008/0071538 A1 * | 3/2008 | Bossemeyer Jr. et al. | 704/247 |
| 2009/0259468 A1 * | 10/2009 | Schroeter | 704/246 |

FOREIGN PATENT DOCUMENTS

| | | |
|---|---|---|
| DE | 10 2008 040 002 A1 | 3/2010 |
| EP | 0 424 071 A2 | 4/1991 |
| EP | 2 006 836 A2 | 12/2008 |
| JP | 2-210500 A | 8/1990 |
| JP | 7-5890 A | 1/1995 |
| JP | 2002-297181 A | 10/2002 |
| WO | WO 2007/111197 A1 | 10/2007 |

* cited by examiner

VOICE RECOGNITION SYSTEM FOR REGISTRATION OF STABLE UTTERANCES

TECHNICAL FIELD

The present invention relates to a voice registration type voice recognition system.

BACKGROUND ART

In a conventional registration type voice recognition system, an utterance to be registered is uttered once, the utterance is compared with a pre-registered standard pattern, and when it is determined that the utterance differs from (is unlikely to be confused with) the standard pattern (pre-registered vocabulary), registration processing is performed (see Patent Document 1, for example).

PRIOR ART DOCUMENTS

Patent Documents

Patent Document 1: Japanese Patent Application Publication No. 2002-297181

SUMMARY OF THE INVENTION

In this conventional registration type voice recognition system, only one utterance of the utterance to be registered is received, and the determination is made as to whether or not to perform registration based on the result of the comparison between the utterance and the standard pattern registered in advance. Therefore, a stability of the utterance to be registered cannot be checked. For example, when a voice section is partially lost in a noisy environment or non-steady noise is mistakenly detected as a voice section, it may be determined that registration is acceptable as long as the content of the utterance differs from the pre-registered standard pattern; as a result, a voice may be registered erroneously to the standard pattern. Thus, in the case where erroneous input is registered as the standard pattern in this manner, registration is performed by a different voice from the content actually uttered by a speaker who wishes to register, and therefore a recognition error may occur when an utterance to be recognized is uttered by the speaker.

The present invention has been designed to solve problems such as those described above, and an object thereof is to provide a voice recognition system such that registration errors caused by non-steady noise, erroneous detection of a voice section, and so on can be reduced, thus improving a voice recognition performance, and that an improvement in convenience and a reduction in unnecessary memory use can be achieved.

A voice recognition system according to the present invention includes: a voice input unit for inputting or receiving a voice uttered a plurality of times; a storage unit for storing voice data uttered the plurality of times and input into the voice input unit; a stability verification unit for determining a similarity between the voice data uttered the plurality of times, and read from the storage unit, and determining that registration of the voice data is acceptable when the similarity is greater than a first threshold; and a standard pattern creation unit for creating a standard pattern by using the voice data where the stability verification unit determines that registration is acceptable; and a re-utterance request unit for executing a re-utterance request of a single utterance, wherein the voice input unit inputs a voice uttered a predetermined plurality of times, and when voice data that can be registered are not included in the voice data of the predetermined plurality of times that are read from the storage unit, the stability verification unit causes the re-utterance request unit to execute the re-utterance request, determines voice data similarities between the voice data of a single utterance corresponding to the re-utterance request and the voice data of the predetermined plurality of times already stored in the storage unit, and when a maximum value of the voice data similarities is greater than a second threshold, determines that registration of voice data having the maximum similarity is acceptable.

According to the present invention, the similarity between the voice data uttered the plurality of times is determined; when the similarity is greater than the first threshold, it is determined that registration of the voice data is acceptable, and a standard pattern is created by using the voice data determined that registration is acceptable; the re-utterance request of the single utterance is executed, and the voice uttered the predetermined plurality of times is input; when voice data that can be registered are not included, the re-utterance request is executed, and similarities between the voice data of the single utterance corresponding to the re-utterance request and the voice data of the predetermined plurality of times already stored are determined, and when the maximum value of the voice data similarities is greater than the second threshold, it is determined that registration of voice data having the maximum similarity is acceptable. Hence, registration errors caused by non-steady noise, erroneous detection of a voice section, and so on can be reduced, thus improving a voice recognition performance, and further, an improvement in convenience and a reduction in unnecessary memory use can be achieved by avoiding unnecessary increases in the number of utterances.

DESCRIPTION OF EMBODIMENTS

Embodiments of the present invention will be described below with reference to the attached drawings in order to illustrate the present invention in further detail.

First Embodiment

Figure 1:
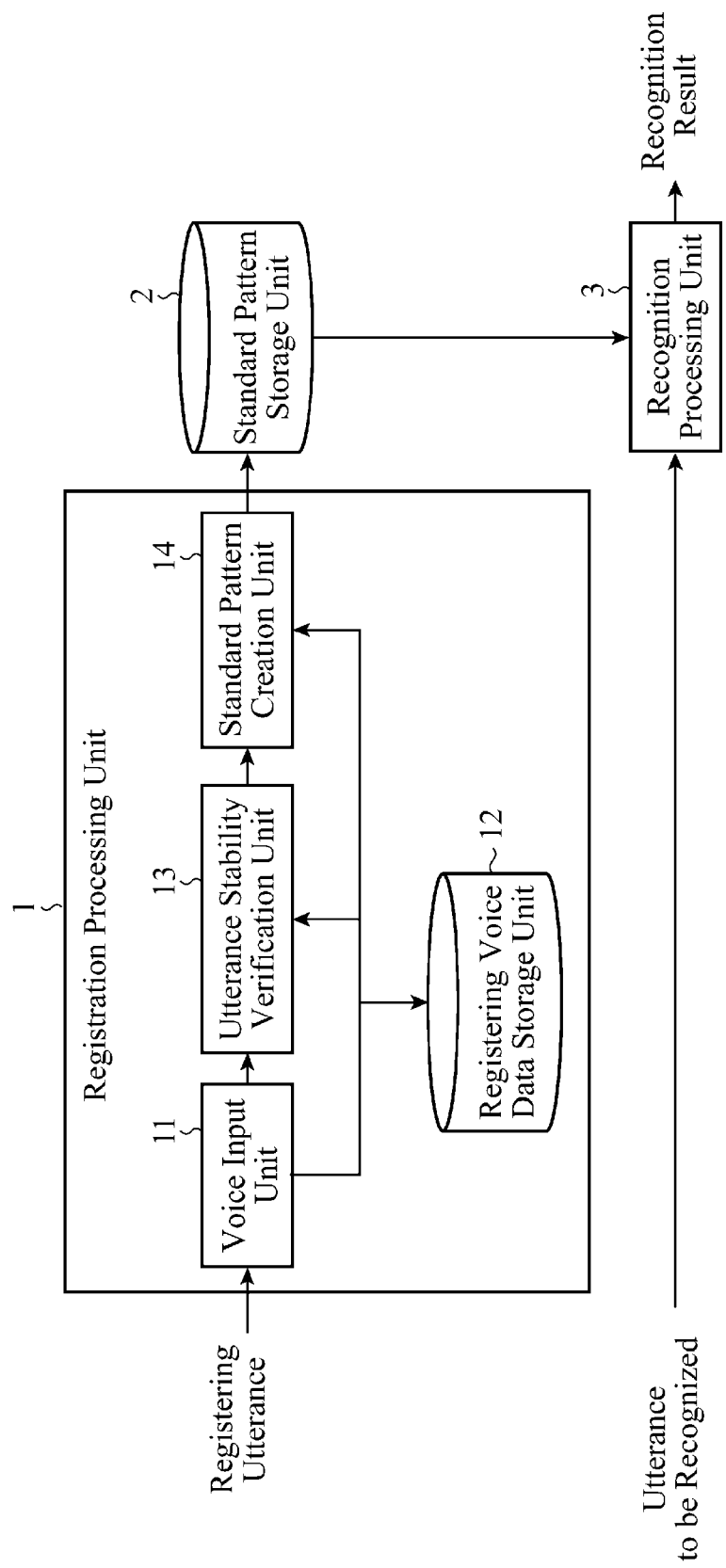
FIG. 1 is a block diagram showing the constitution of a registration type voice recognition system in accordance with a first embodiment of the present invention.

FIG. 1 is a block diagram showing the constitution of a registration type voice recognition system in accordance with a first embodiment of the present invention. In FIG. 1, the voice recognition system in accordance with the first embodiment includes a registration processing unit 1, a standard pattern storage unit 2, and a recognition processing unit 3.

The registration processing unit 1 is means for inputting an utterance intended to be registered (to be referred to hereafter as a registering utterance) uttered by a speaker (to be referred to hereafter as a registration speaker) who wishes to register the utterance as a standard pattern, and creating a standard pattern, and includes a voice input unit 11, a registering voice data storage unit (storage unit) 12, an utterance stability verification unit (stability verification unit) 13, and a standard pattern creation unit 14.

The voice input unit 11 is means for receiving the registering utterance a plurality of times and creating a plurality of pieces of registering voice data corresponding to these registering utterances of the plurality of times. The registering voice data storage unit 12 is a storage unit for storing the registering voice data created by the voice input unit 11. The utterance stability verification unit 13 is means for calculating a similarity with the plurality of pieces of registering voice data stored in the registering voice data storage unit 12; and determining that registration of the plurality of pieces of registering voice data is acceptable when the similarity is equal to or greater than a predetermined threshold, while determining that registration of the plurality of pieces of registering voice data is not acceptable when the similarity is less than the threshold. The standard pattern creation unit 14 is means for creating a standard pattern by using the registering utterance (voice) data where the utterance stability verification unit 13 determines that registration is acceptable.

The standard pattern storage unit 2 is a storage unit for storing the standard pattern created by the registration processing unit 1. The recognition processing unit 3 is means for executing voice recognition of an utterance intended to be recognized (to be referred to hereafter as an utterance to be recognized) uttered from the speaker by using the standard pattern stored in the standard pattern storage unit 2.

Note that the voice input unit 11, utterance stability verification unit 13, standard pattern creation unit 14, and recognition processing unit 3 may be realized on a computer as a specific means generated through a cooperation between software and hardware by reading a voice registration/recognition program corresponding to the purport of the present invention onto the computer and executing the program on a CPU thereof. Further, the registering voice data storage unit 12 and the standard pattern storage unit 2 may be constructed in a storage area of a storage device (for example, a hard disk device, an external storage medium, and so on) provided in the computer.

Next, an operation thereof will be described.

Figure 2:
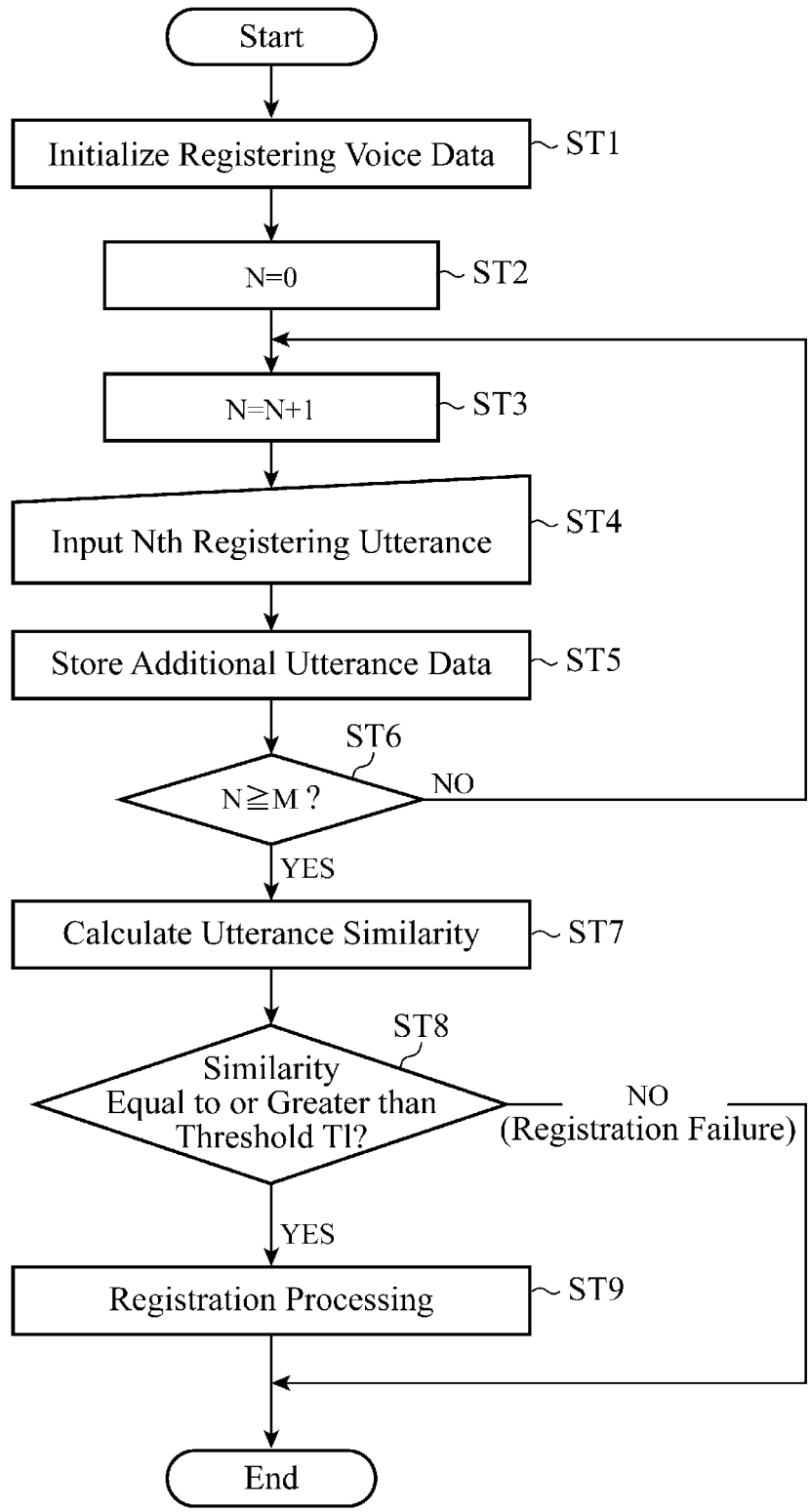
FIG. 2 is a flowchart showing the flow of an operation performed by a registration processing unit in FIG. 1.

FIG. 2 is a flowchart showing the flow of an operation performed by the registration processing unit in FIG. 1. Referring to this drawing, operations of the constitutional units of the registration processing unit 1 will be described in detail.

When registration processing is started by an operation from the outside of the system or the like, the voice input unit 11 initializes the registering voice data stored in the registering voice data storage unit 12 (deletes the registering voice data) (step ST1), and sets a count value of a counter (not shown in FIG. 1) for counting the number of utterances N at 0 (step ST2).

In this condition, the registration speaker utters an utterance (registering utterance) to the registration processing unit 1. The voice input unit 11 then increases the count value of the counter for counting the number of utterances N by one (step ST3), whereupon the registering utterance uttered by the registration speaker is input sequentially (step ST4). Next, the voice input unit 11 stores the input registering utterance in the registering voice data storage unit 12 as registering voice data (step ST5).

Every time the registering utterance is input, the voice input unit 11 compares the number of utterances N counted by the counter with a predetermined threshold M to determine whether or not the number of utterances N is equal to or greater than the threshold M (step ST6). The threshold M is the number of times that the identical content is assumed to be uttered, and that is defined by an integer value of 2 or more. When the number of utterances N is less than the threshold M (step ST6: NO), the voice input unit 11 returns to the processing of the step ST3 and repeats the processing of the step ST3 to the step ST5 until the number of utterances N reaches or exceeds the threshold M.

On the other hand, when the number of utterances N is equal to or greater than the threshold M (step ST6: YES), the utterance stability verification unit 13 calculates a similarity with the registering-voice data stored in the registering voice data storage unit 12 (step ST7). The similarity of the plurality of pieces of registering voice data is calculated by using the following method, for example.

(1) Calculation Method 1

When registering voice data indicating the identical content of the number of utterances M are stored in the registering voice data storage unit 12, the utterance stability verification unit 13 determines all the combinations of two utterances in the registering voice data of the number of utterances M. Next, the utterance stability verification unit 13 extracts a feature of the registering voice data for each of the two utterances and calculates a similarity with the registering voice data between the two utterances by dynamic programming using the feature. This similarity is determined from all the combinations of the two utterances, whereupon an average value of the obtained similarities is set as the similarity with the registering voice data of the number of utterances M.

(2) Calculation Method 2

In the calculation method 1, a minimum similarity (similarity between the most unlike utterances), from among the similarities of all the combinations of the two utterances, is set as the similarity with the registering voice data of the number of utterances M, instead of the average value of the similarities.

(3) Calculation Method 3

When calculating the similarities between the registering voice data in the combinations of the two utterances, the utterance stability verification unit 13, the standard pattern creation unit 14, and the recognition processing unit 3 cooperate to register one utterance of the above combinations as a temporary standard pattern, perform voice recognition by using the other utterance as an input, and use a score (likelihood) obtained as a recognition result as the similarity of the registering voice data between the two utterances. Then, the similarity is determined from all the combinations of the two utterances, whereupon the average value or the minimum similarity of the obtained similarities is set as the similarity with the registering voice data of the number of utterances M.

Next, the utterance stability verification unit 13 determines whether or not the similarity with the registering voice data of the number of utterances M or more calculated in the step ST7 is equal to or greater than a predetermined threshold Tl (a first threshold) (step ST8). When the similarity is less than the threshold Tl (step ST8: NO), the utterance stability verification unit 13 determines that the input utterances lack stability, and terminates the registration determination as a so-called registration failure, that is not creating a standard pattern for the registering voice data stored in the registering voice data storage unit 12.

When the similarity is equal to or greater than the threshold Tl (step ST8: YES), the utterance stability verification unit 13 notifies the standard pattern creation unit 14 of the affirmative. Upon reception of this notification, the standard pattern creation unit 14 creates a standard pattern from the registering voice data stored in the registering voice data storage unit 12 and registers the created standard pattern in the standard pattern storage unit 2 (step ST9, registration processing).

As an example of the standard pattern, for example, when a voice feature is extracted for each unit time with respect to the registering voice data (input utterance voice), time series data (feature vector time series) of these voice features may be specified. Alternatively, when a model representing the characteristics of each voice piece that is created for each voice piece (syllable, phoneme, and so on) in a voice is created in advance, a time series (label series) of the models of the voice piece may be registering as the standard pattern.

In a step ST9, the standard pattern creation unit 14 creates respective standard patterns based on the registering voice data of K (where K is an integer between 1 and M) pieces of the registering voice data that have been stored in the registering voice data storage unit 12, and registers these K standard patterns in the standard pattern storage unit 2. Examples of methods for selecting the K pieces of the registering voice data include: a method of selecting the K pieces of the data in order of the closeness of the similarities calculated for the respective combinations by the utterance stability verification unit 13; and a method of determining a center of gravity as the feature of the registering voice data and selecting the K pieces of the data in order of closeness to the center of gravity.

Note that instead of creating the K standard patterns, voice features may be extracted in relation to the K pieces of the registering voice data, respectively, whereupon voice data for registration having an average feature of the features are created and registered as the standard pattern.

As described above, the first embodiment includes the voice input unit 11 for inputting a voice uttered a plurality of times, the registering voice data storage unit 12 for storing voice data uttered the plurality of times and input into the voice input unit 11, the utterance stability verification unit 13 for determining a similarity between the voice data uttered the plurality of times and read from the registering voice data storage unit 12, and determining that registration of the voice data is acceptable when the similarity is greater than the threshold Tl, and the standard pattern creation unit 14 for creating a standard pattern by using the voice data where the utterance stability verification unit 13 determines that registration is acceptable. With this constitution, the registering utterance is input a plurality of times and registration processing is performed only when the similarity between the utterances is a predetermined threshold or more, and further registration is performed only when the plurality of input utterances are close (similar). Hence, since the registration is completed only when a plurality of utterances having the identical content are close, that is, only when the input utterance is stable, registration errors caused by non-steady noise, erroneous detection of a voice section, and so on can be reduced, thereby improving a voice recognition performance (recognition rate).

Further, in accordance with the first embodiment, since a standard pattern is created from the plurality of utterances during the registration, a standard pattern corresponding to variations in the utterance can be created, thereby improving the performance of a voice recognition operation that uses the standard pattern.

Second Embodiment

Figure 3:
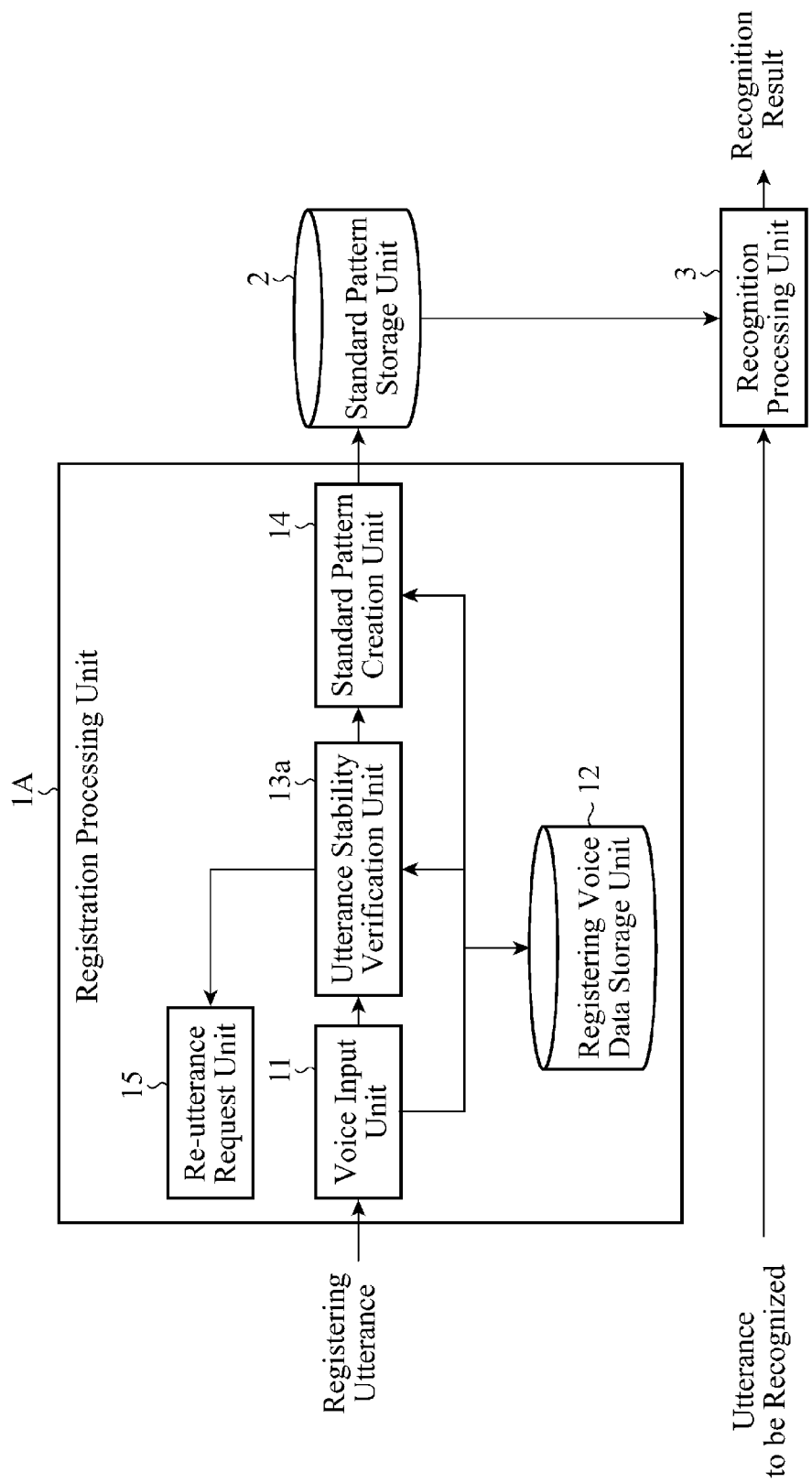
FIG. 3 is a block diagram showing the constitution of a registration type voice recognition system in accordance with a second embodiment of the present invention.

FIG. 3 is a block diagram showing the constitution of a registration type voice recognition system in accordance with a second embodiment of the present invention. In FIG. 3, the voice recognition system in accordance with the second embodiment includes a registration processing unit 1A, the standard pattern storage unit 2, and the recognition processing unit 3. The registration processing unit 1A includes the voice input unit 11, the registering voice data storage unit 12, an utterance stability verification unit 13*a*, the standard pattern creation unit 14, and a re-utterance request unit 15.

The utterance stability verification unit 13*a* is means for calculating similarities between respective combinations of registering voice data uttered to have the identical content of the number of a predetermined times (M utterances), from among the plurality of pieces of registering voice data stored in the registering voice data storage unit 12, determining the combination of M utterances having a maximum similarity and the similarity thereof; and determining that registration is acceptable when the similarity is equal to or greater than a predetermined threshold, while determining that registration is not acceptable when the similarity is less than the threshold. The re-utterance request unit 15 is means for making a re-utterance request to the registration speaker when the utterance stability verification unit 13*a* determines that registration is not acceptable. Note that constitutional elements other than the utterance stability verification unit 13*a* and the re-utterance request unit 15 are identical to those in the first embodiment, and therefore descriptions thereof will be omitted.

Next, an operation thereof will be described.

Figure 4:
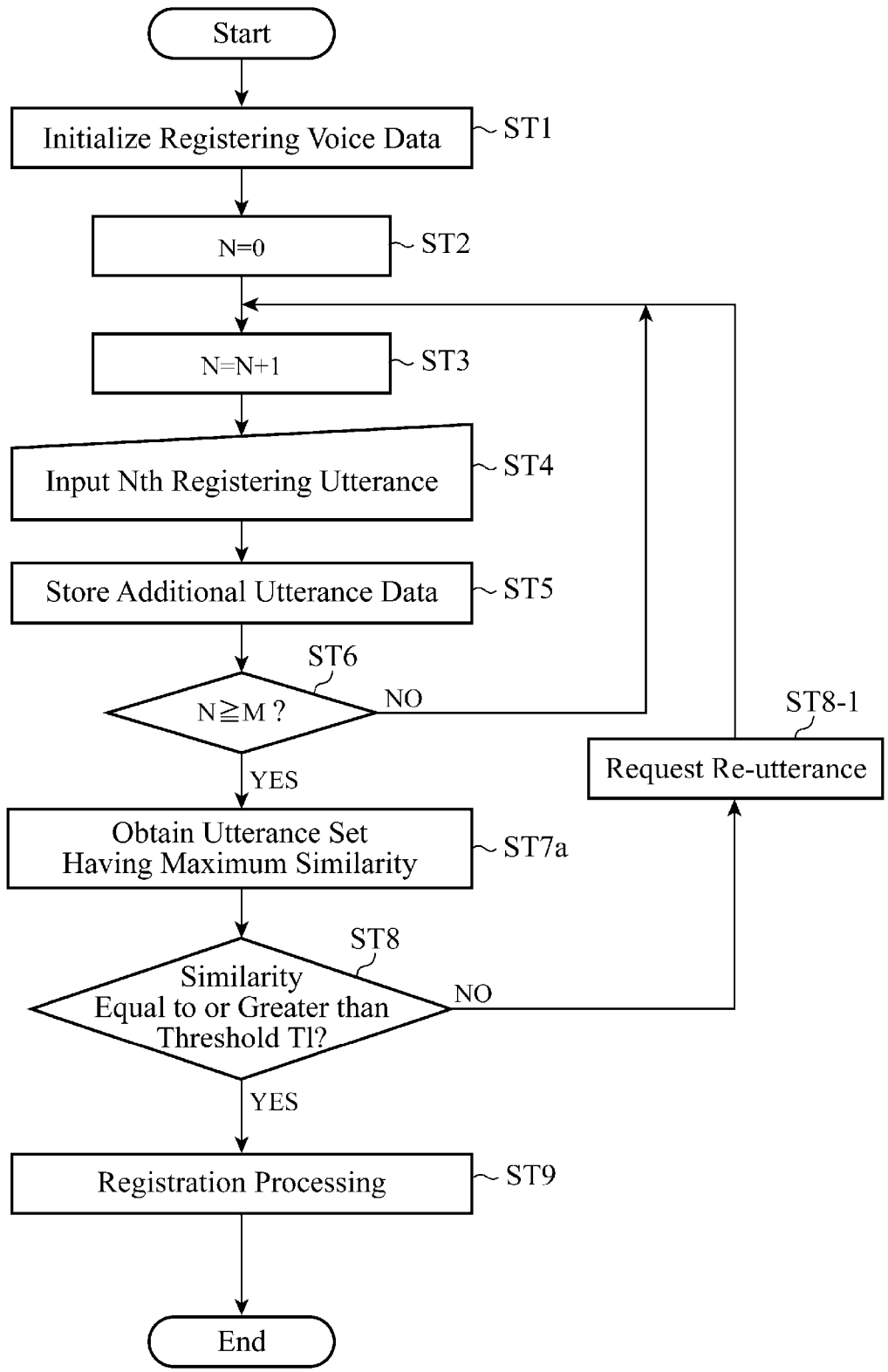
FIG. 4 is a flowchart showing the flow of an operation performed by a registration processing unit in FIG. 3.

FIG. 4 is a flowchart showing the flow of an operation performed by the registration processing unit in FIG. 3. Referring to this drawing, operations of the constitutional units of the registration processing unit 1A will be described in detail. In FIG. 4, processings from a step ST1 to a step ST6 are similar in content to those of the first embodiment shown in FIG. 2, and therefore descriptions thereof will be omitted.

When the number of utterances N is equal to or greater than the threshold M (step ST6: YES), the utterance stability verification unit 13*a* calculates similarities with respective combinations of the registering voice data of M utterances uttered to have the identical content, from among the registering voice data stored in the registering voice data storage unit 12, and then determines the combination of M utterances having the maximum similarity and the similarity thereof (step ST7*a*). Note that the similarities between the respective combinations of the registering voice data corresponding to the plurality of utterances (M utterances) are calculated in a similar manner to the first embodiment.

After determining the combination of M utterances having the maximum similarity and the similarity thereof, the utterance stability verification unit 13*a* determines whether or not the determined maximum similarity is equal to or greater than the predetermined threshold Tl (step ST8). When the maximum similarity is equal to or greater than the threshold Tl (step ST8: YES), the utterance stability verification unit 13*a* notifies the standard pattern creation unit 14 of the affirmative. Upon reception of this notification, the standard pattern creation unit 14 creates a standard pattern from the registering voice data of the M utterances and registers the created standard pattern in the standard pattern storage unit 2 (step ST9, registration processing).

On the other hand, when the maximum similarity is less than the threshold Tl (step ST8: NO), the utterance stability verification unit 13a notifies the re-utterance request unit 15 of the negative. Upon reception of this notification, the re-utterance request unit 15 requests re-utterance of a single utterance to the registration speaker by document display or voice output using a display device, a speaker, or the like, not shown in the drawings (step ST8-1).

When the registration speaker gives the single utterance in this condition, the voice input unit 11 increases the count value of the counter for counting the number of utterances N by one (step ST3), whereupon the processing of the step ST4 to the step ST8 is repeated until the maximum similarity reaches or exceeds the threshold Tl (step ST8: YES).

In this case, since the similarities of the combinations of registering voice data of M utterances not including the re-uttered, single utterance have already been calculated, a similarity should be calculated for a combination of the registering voice data of M utterances including the single utterance newly added by the re-utterance. For example, a similarity between pieces of voice data of M utterances combining the voice data of the newly added single utterance with the voice data of (M−1) times already registering in the registering voice data storage unit 12 is determined. The combination of the utterances having the maximum similarity is then specified, and when the maximum similarity is equal to or greater than the threshold, the voice data of the corresponding combination are registered.

As described above, the second embodiment includes the re-utterance request unit 15 for executing a re-utterance request of a single utterance; the voice input unit 11 inputs a voice uttered a predetermined plurality of times, and when voice data that can be registered are not included in the voice data of the predetermined plurality of times that are read from the registering voice data storage unit 12, the utterance stability verification unit 13a causes the re-utterance request unit 15 to execute a re-utterance request, determines similarities in voice data between the voice data of a single utterance corresponding to the re-utterance request and the voice data of the plurality of times already stored in the registering voice data storage unit 12, and when a maximum value of the similarities invoice data is greater than the threshold Tl, determines that registration of the voice data providing the corresponding maximum similarity is acceptable. With this constitution, similar effects to those of the first embodiment are obtained, and also the number of utterances required for registration can be reduced in comparison with a case where the registering utterance is re-uttered M times following a registration failure, thereby reducing a burden placed on the registration speaker.

Figure 5:
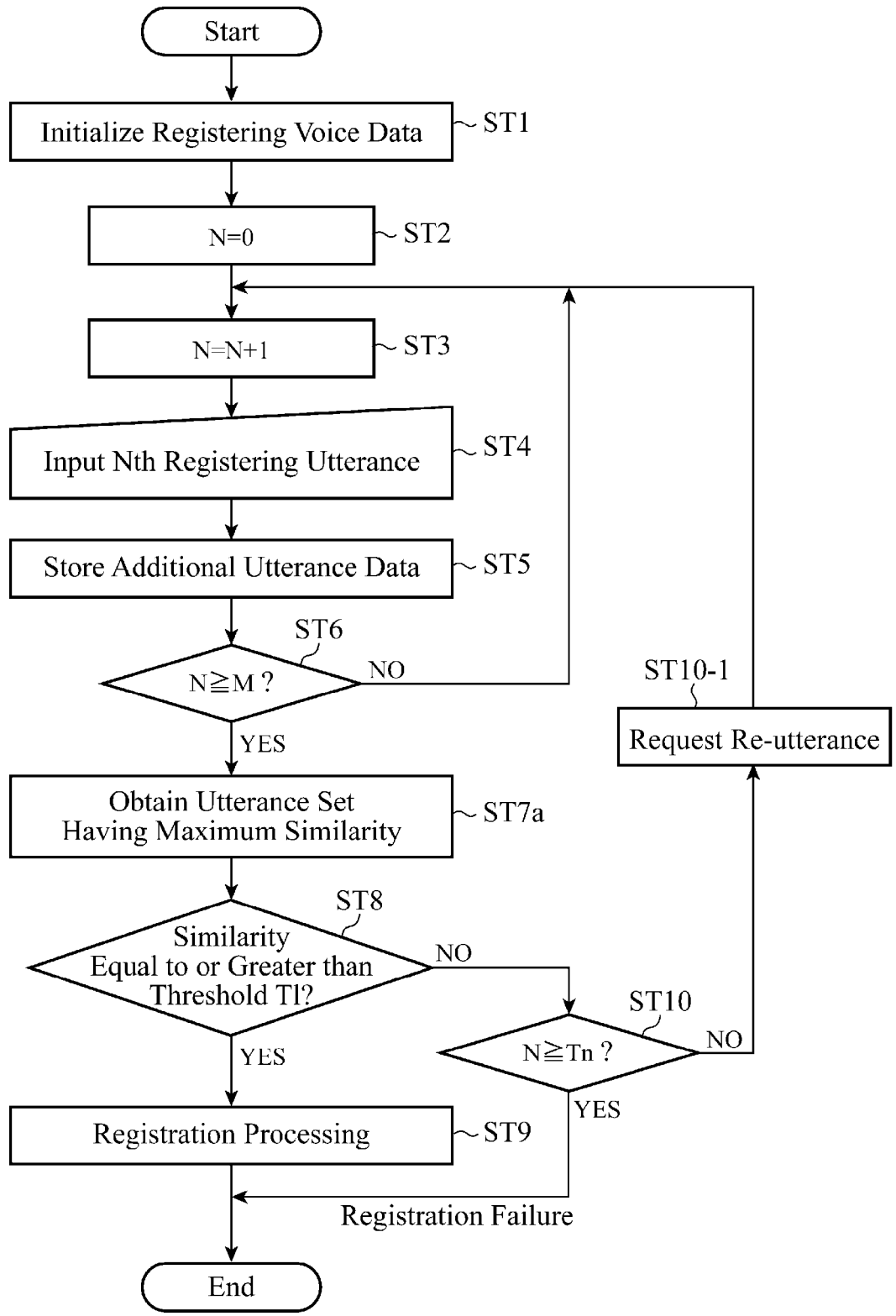
FIG. 5 is a flowchart showing another example of the operation performed by the registration processing unit in FIG. 3.

Further, in the above second embodiment, as shown in FIG. 5, the following step ST10 may be added: the voice input unit 11 compares the number of utterances N (where N is equal to or greater than M) counted by the counter with a predetermined threshold Tn indicating an upper limit of the number of utterances, when the maximum similarity is less than the threshold Tl (step ST8: NO), to determine whether or not the number of utterances N is equal to or greater than the threshold Tn.

Here, when the number of utterances N is less than the threshold Tn (step ST10: NO), the voice input unit 11 notifies the re-utterance request unit 15 of the negative via the utterance stability verification unit 13a. Upon reception of this notification, the re-utterance request unit 15 makes a request for the re-utterance of a single utterance to the registration speaker (step ST10-1).

Further, when the number of utterances N is equal to or greater than the threshold Tn (step ST10: YES), the utterance stability verification unit 13a determines a registration failure. Hence, when the number of utterances N is equal to or greater than the threshold Tn, the registration determination is terminated as a registration failure without inputting the registering utterance again.

Figure 6:
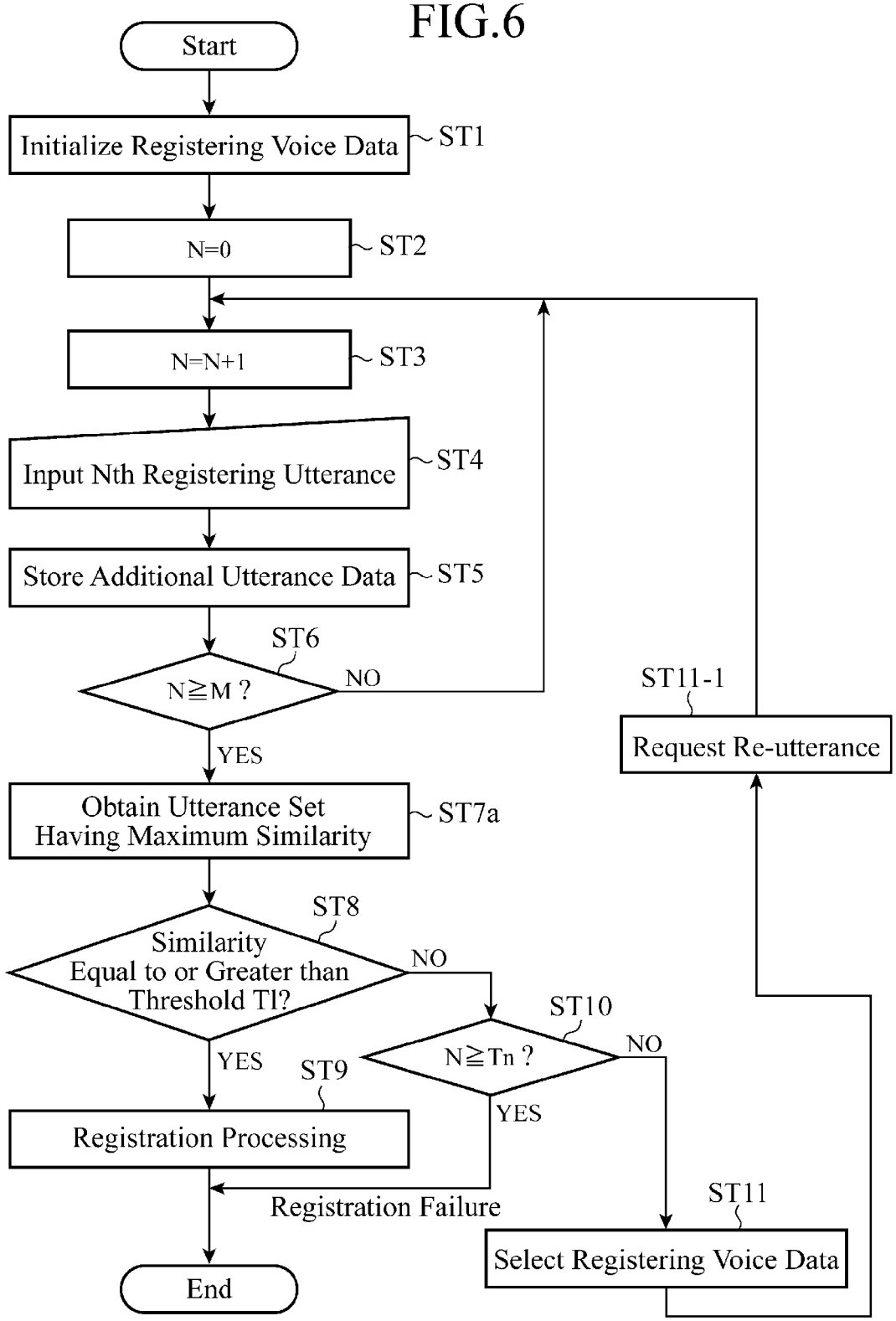
FIG. 6 is a flowchart showing still another example of the operation performed by the registration processing unit in FIG. 3.

Furthermore, in the above second embodiment, as shown in FIG. 6, the following step ST11 may be added: the utterance stability verification unit 13a selects registering voice data of the newest L (where L is an integer value of M or more) utterances from the registering voice data stored in the registering voice data storage unit 12, and deletes the remaining registering voice data when the number of utterances N is less than the threshold Tn (step ST10: NO). When the processing of the step ST11 is completed, the re-utterance request unit 15 makes a request for the re-utterance of a single utterance to the registration speaker (step ST11-1). Thus, similarity confirmation and registration processing are executed by using voice data corresponding to L+1 utterances combining the voice data of the newly obtained single utterance with the registering voice data for the L utterances already stored in the registering voice data storage unit 12.

Further, the registering voice data combination from which the maximum similarity is obtained may be selected as a standard for keeping the registering voice data of the L utterances. The method for calculating the maximum similarity is similar to that of the step ST7a, in which similarities of registering voice data combinations of M utterances are calculated.

Note that when L=M, the combination of the registering voice data of the L utterances is the one of the registering voice data of the M utterances having the maximum similarity that is determined in the step ST7a.

As described above, by inputting the registering utterance one utterance at a time without determining a registration failure in a case where the registering utterance does not satisfy a registration condition, the number of input utterances can be reduced in comparison with a case where the utterance is re-uttered M times whenever registration fails; as a result, a registration type voice recognition system that is highly convenient for the registration speaker can be obtained.

Further, by setting an upper limit (threshold Tn) on the number of times the utterance is re-uttered at the time of a registration failure, a situation in which registration cannot be performed despite continuously uttering the registering utterance can be eliminated. In such a situation, it is highly likely that the cause of the registration failure is a poor registration (utterance) environment. Hence, by terminating the registration processing as a failure when the number of utterances reaches or exceeds the threshold Tn, guidance such as a recommendation to change the utterance environment of the registration operation can be issued, and thus a user-friendly system can be provided.

Moreover, by setting an upper limit (L utterances) on the number of pieces of recorded registering voice data, a recording area of the registering voice data storage unit 12 can be used economically and a calculation amount required to calculate the maximum similarity can be reduced.

INDUSTRIAL APPLICABILITY

With the voice recognition system according to the present invention, registration errors caused by non-steady noise, erroneous detection of a voice section, and so on can be reduced, thus improving a voice recognition performance, and also an improvement in convenience and a reduction in unnecessary memory use can be achieved by avoiding unnecessary increases in the number of utterances. Accordingly, the present invention is suitable for use as a voice registration type voice recognition system or the like.

The invention claimed is:

1. A voice recognition system for performing voice recognition of an utterance to be recognized by using a standard pattern, comprising:
   a storage unit for storing voice data; and
   a computer processor configured to execute a process including:
      repeatedly inputting an utterance and storing voice data of the inputted utterance in the storage unit until the storage unit stores respective voice data of a predetermined number of utterances;
      performing stability verification by:
         determining similarities between the respective voice data of each pair of inputted utterances stored in the storage unit,
         determining an overall similarity based on the determined similarities, and
         determining that registration of the voice data of the predetermined number of utterances is acceptable when the overall similarity is greater than a first threshold;
      creating a standard pattern by using the voice data of the predetermined number of utterances when the stability verification determines that registration is acceptable; and
   wherein, when the stability verification determines that registration of the voice data of the predetermined number of utterances read from the storage unit is unacceptable, the process further includes:
      executing a re-utterance request causing a single utterance to be inputted and voice data of the single utterance to be stored in the storage unit;
      determining respective voice data similarities between voice data of the single utterance corresponding to the re-utterance request and the voice data of the predetermined number of utterances previously stored in the storage unit; and
      when a maximum value of the respective voice data similarities is greater than a second threshold, determining that registration of the respective voice data of the single utterance and the previously-stored utterance corresponding to the maximum similarity is acceptable.

2. The voice recognition system according to claim 1, wherein when the stability verification determines that registration of the voice data for the predetermined number of utterances that are read from the storage unit is unacceptable, and also the number of inputted utterances including any inputted utterances corresponding to re-utterance requests reaches a third threshold, the process terminates a registration determination as a failure to register the voice, instead of executing another re-utterance request.

3. The voice recognition system according to claim 1, wherein when the stability verification determines that registration of the voice data of the predetermined number of utterances that are read from the storage unit is unacceptable, and the maximum value of the respective voice data similarities based on the executed re-utterance request is less than the second threshold, the process further includes:
   deleting the voice data of an utterance from the storage unit thereby leaving the respective voice data of a predetermined number of utterances;
   executing a new re-utterance request causing another single utterance to be newly inputted;
   determining respective voice data similarities between the voice data for the newly-inputted single utterance corresponding to the new re-utterance request and the voice data of the predetermined number of utterances left in the storage unit; and
   when a maximum value of the voice data similarities involving the newly-inputted single utterance is greater than the second threshold, determining that registration of the respective voice data of the newly-inputted single utterance and the other utterance in the storage unit corresponding to the maximum similarity is acceptable.

4. The voice recognition system according to claim 3, wherein the process further includes determining the utterance whose voice data is deleted from the storage unit by:
   identifying respective voice data of a predetermined number of utterances stored in the storage unit corresponding to combinations of the voice data stored in the storage unit having maximum similarities; and
   leaving the identified voice data in the storage unit.

* * * * *